(12) United States Patent
Bigot-Astruc et al.

(10) Patent No.: US 8,867,879 B2
(45) Date of Patent: Oct. 21, 2014

(54) SINGLE-MODE OPTICAL FIBER

(75) Inventors: Marianne Bigot-Astruc, Marcoussis (FR); Pierre Sillard, Le Chesnay (FR); Simon Richard, Villebon sur Yvette (FR)

(73) Assignee: Draka Comteq, B.V., Amsterdam (NL)

( * ) Notice: Subject to any disclaimer, the term of this patent is extended or adjusted under 35 U.S.C. 154(b) by 378 days.

(21) Appl. No.: 13/175,181

(22) Filed: Jul. 1, 2011

(65) Prior Publication Data

US 2012/0051703 A1 Mar. 1, 2012

(30) Foreign Application Priority Data

Jul. 2, 2010 (FR) ...................................... 10 55368

(51) Int. Cl.
*G02B 6/036* (2006.01)
*G02B 6/02* (2006.01)
*G02B 6/028* (2006.01)

(52) U.S. Cl.
CPC .......... *G02B 6/02019* (2013.01); *G02B 6/0281* (2013.01); *G02B 6/0365* (2013.01)
USPC .......................................... 385/123; 385/127

(58) Field of Classification Search
None
See application file for complete search history.

(56) References Cited

U.S. PATENT DOCUMENTS

| | | | |
|---|---|---|---|
| 4,838,643 A | 6/1989 | Hodges et al. | |
| 5,194,714 A | 3/1993 | Le Sergent | |
| 5,522,007 A | 5/1996 | Drouart et al. | |
| 5,574,816 A | 11/1996 | Yang et al. | |
| 5,717,805 A | 2/1998 | Stulpin | |
| 5,761,362 A | 6/1998 | Yang et al. | |
| 5,781,684 A * | 7/1998 | Liu ............................... | 385/124 |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,202,447 B1 | 3/2001 | Drouart et al. | |

(Continued)

FOREIGN PATENT DOCUMENTS

| | | |
|---|---|---|
| EP | 1477831 A1 | 11/2004 |
| EP | 1852721 A1 | 11/2007 |

(Continued)

OTHER PUBLICATIONS

French Search Report in counterpart French Application No. 10/55368 dated Mar. 9, 2011, pp. 1-7.

(Continued)

*Primary Examiner* — Mike Stahl
(74) *Attorney, Agent, or Firm* — Additon, Higgins & Pendleton, P.A.

(57) ABSTRACT

A single-mode optical fiber includes a central core, an intermediate cladding, a buried trench, and optical cladding. The central core has an outer radius $r_1$ and a refractive index difference $\Delta n_1$ relative to the optical cladding. The intermediate cladding has an outer radius $r_2$ and a refractive index difference $\Delta n_2$ relative to the optical cladding. The buried trench has an outer radius $r_3$ and a refractive index difference $\Delta n_3$ relative to the optical cladding. The optical fiber typically has an effective area of about 150 $\mu m^2$ or greater at a wavelength of 1550 nanometers and exhibits low bending losses.

23 Claims, 2 Drawing Sheets

(56) References Cited

U.S. PATENT DOCUMENTS

| | | | |
|---|---|---|---|
| 6,210,802 B1 | 4/2001 | Risch et al. | |
| 6,215,931 B1 | 4/2001 | Risch et al. | |
| 6,269,663 B1 | 8/2001 | Drouart et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,483,975 B1 | 11/2002 | Hsu et al. | |
| 6,493,491 B1 | 12/2002 | Shen et al. | |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,658,190 B2 | 12/2003 | Hirano et al. | |
| 6,749,446 B2 | 6/2004 | Nechitailo | |
| 6,904,218 B2 | 6/2005 | Sun et al. | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 7,045,010 B2 | 5/2006 | Sturman, Jr. | |
| 7,076,139 B1 | 7/2006 | Aikawa et al. | |
| 7,162,128 B2 | 1/2007 | Lovie et al. | |
| 7,254,305 B2 | 8/2007 | Mishra | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,483,613 B2 | 1/2009 | Bigot-Astruc et al. | |
| 7,515,795 B2 | 4/2009 | Overton et al. | |
| 7,526,177 B2 | 4/2009 | Matthijsse et al. | |
| 7,555,186 B2 | 6/2009 | Flammer et al. | |
| 7,555,187 B2 | 6/2009 | Bickham et al. | |
| 7,567,739 B2 | 7/2009 | Overton et al. | |
| 7,570,852 B2 | 8/2009 | Nothofer et al. | |
| 7,574,095 B2 | 8/2009 | Lock et al. | |
| 7,587,111 B2 | 9/2009 | de Montmorillon et al. | |
| 7,599,589 B2 | 10/2009 | Overton et al. | |
| 7,620,282 B2 | 11/2009 | Bickham et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,665,902 B2 | 2/2010 | Griffioen et al. | |
| 7,676,129 B1 * | 3/2010 | Bookbinder et al. | 385/123 |
| 7,702,204 B2 | 4/2010 | Gonnet et al. | |
| 7,724,998 B2 | 5/2010 | Parris et al. | |
| 7,817,891 B2 | 10/2010 | Lavenne et al. | |
| 7,889,960 B2 | 2/2011 | de Montmorillon et al. | |
| 7,903,917 B2 | 3/2011 | Bickham et al. | |
| 7,970,247 B2 | 6/2011 | Barker | |
| 7,974,507 B2 | 7/2011 | Lovie et al. | |
| 7,995,888 B2 | 8/2011 | Gholami et al. | |
| 8,009,950 B2 | 8/2011 | Molin et al. | |
| 8,031,997 B2 | 10/2011 | Overton | |
| 8,041,167 B2 | 10/2011 | Overton | |
| 8,041,168 B2 | 10/2011 | Overton | |
| 8,041,172 B2 | 10/2011 | Sillard et al. | |
| 8,055,111 B2 | 11/2011 | Sillard et al. | |
| 8,081,853 B2 | 12/2011 | Overton | |
| 8,145,027 B2 | 3/2012 | Overton et al. | |
| 8,265,442 B2 | 9/2012 | Overton | |
| 2008/0279515 A1 | 11/2008 | Bickham et al. | |
| 2008/0292262 A1 | 11/2008 | Overton et al. | |
| 2009/0175583 A1 | 7/2009 | Overton | |
| 2009/0214167 A1 | 8/2009 | Lookadoo et al. | |
| 2009/0279833 A1 | 11/2009 | Overton et al. | |
| 2009/0279835 A1 | 11/2009 | de Montmorillon et al. | |
| 2009/0297107 A1 | 12/2009 | Tatat | |
| 2010/0021170 A1 | 1/2010 | Lumineau et al. | |
| 2010/0092135 A1 | 4/2010 | Barker et al. | |
| 2010/0092138 A1 | 4/2010 | Overton | |
| 2010/0118388 A1 | 5/2010 | Pastouret et al. | |
| 2010/0119202 A1 | 5/2010 | Overton | |
| 2010/0135624 A1 | 6/2010 | Overton et al. | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0214649 A1 | 8/2010 | Burov et al. | |
| 2010/0215328 A1 | 8/2010 | Tatat et al. | |
| 2010/0310218 A1 | 12/2010 | Molin et al. | |
| 2011/0026889 A1 | 2/2011 | Risch et al. | |
| 2011/0044595 A1 | 2/2011 | Sillard et al. | |
| 2011/0058781 A1 | 3/2011 | Molin et al. | |
| 2011/0064367 A1 | 3/2011 | Molin et al. | |
| 2011/0064371 A1 | 3/2011 | Leatherman et al. | |
| 2011/0069724 A1 | 3/2011 | Richard et al. | |
| 2011/0069932 A1 | 3/2011 | Overton et al. | |
| 2011/0091171 A1 | 4/2011 | Tatat et al. | |
| 2011/0116160 A1 | 5/2011 | Boivin et al. | |
| 2011/0123161 A1 | 5/2011 | Molin et al. | |
| 2011/0123162 A1 | 5/2011 | Molin et al. | |
| 2011/0129191 A1 * | 6/2011 | Bickham et al. | 385/127 |
| 2011/0135262 A1 | 6/2011 | Molin et al. | |
| 2011/0135263 A1 | 6/2011 | Molin et al. | |
| 2011/0176782 A1 | 7/2011 | Parris | |
| 2011/0188823 A1 | 8/2011 | Sillard et al. | |
| 2011/0188826 A1 | 8/2011 | Sillard et al. | |
| 2011/0217012 A1 | 9/2011 | Bigot-Astruc et al. | |
| 2011/0229101 A1 | 9/2011 | de Montmorillon et al. | |
| 2011/0268398 A1 | 11/2011 | Quinn et al. | |
| 2011/0268400 A1 | 11/2011 | Lovie et al. | |
| 2011/0287195 A1 | 11/2011 | Molin | |
| 2012/0009358 A1 | 1/2012 | Gharbi et al. | |
| 2012/0051703 A1 | 3/2012 | Bigot-Astruc et al. | |
| 2012/0106909 A1 * | 5/2012 | Bickham et al. | 385/124 |
| 2012/0177333 A1 * | 7/2012 | Tsuchida et al. | 385/124 |
| 2013/0071079 A1 * | 3/2013 | Peckham et al. | 385/124 |

FOREIGN PATENT DOCUMENTS

| | | |
|---|---|---|
| EP | 1921478 A1 | 5/2008 |
| EP | 1978383 A1 | 10/2008 |
| EP | 2402799 A1 | 1/2012 |
| WO | 2008/027351 A2 | 3/2008 |
| WO | 2008/137150 A1 | 11/2008 |
| WO | 2009/062131 A1 | 5/2009 |

OTHER PUBLICATIONS

Bigot-Astruc et al., "Trench-Assisted Profiles for Large-Effective-Area Single-Mode Fibers", ECOC, Brussels, Sep. 21, 2008, pp. 1-2 [Cited in FR and EP Search Reports].

European Search Report and Written Opinion in counterpart European Application No. 11169805.6 dated Nov. 8, 2011, pp. 1-6.

* cited by examiner

SINGLE-MODE OPTICAL FIBER

CROSS-REFERENCE TO PRIORITY APPLICATION

This application hereby claims the benefit of pending French Application No. 1055368 for a "Fibre Optique Monomode" (filed Jul. 2, 2010 at the National Institute of Industrial Property (France)), which is hereby incorporated by reference in its entirety.

FIELD OF THE INVENTION

The present invention relates to the field of optical fiber transmission and, more specifically, to an optical fiber having an enlarged effective area without increased bending losses.

BACKGROUND

Generally speaking, in the field of optical fibers, the concept of effective area may be used for calculating non-linear effects. An optical fiber's effective area usually corresponds to the usable portion of the optical fiber, which is defined based upon the modal distribution of the field propagating in the optical fiber. By way of non-limiting example, the effective area ($A_{\mathit{eff}}$) is defined as follows:

$$A_{\mathit{eff}} = 2\pi \frac{\left(\int_0^\infty |F(r)|^2 r\, dr\right)^2}{\int_0^\infty |F(r)|^4 r\, dr},$$

where F(r) is the modal distribution of the fundamental mode (LP01) at the radius r (i.e., at the polar distance r in the polar coordinates of a point in a axis system transverse to and centered relative to the optical fiber).

Moreover, for optical fibers, the refractive-index profile is generally classified according to the graphical appearance of the function associating the refractive index with the radius of the optical fiber. Conventionally, the distance r to the center of the optical fiber is shown on the x axis, and the difference between the refractive index (at radius r) and the refractive index of the optical fiber's outer cladding (e.g., an outer optical cladding) is shown on the y axis. The outer cladding, functioning as an optical cladding, typically has a refractive index that is substantially constant. This outer cladding is typically made of pure silica but may also contain one or more dopants.

The refractive-index profile is referred to as a "step" profile, "trapezoidal" profile, "alpha" profile, or "triangular" profile for graphs having the respective shapes of a step, a trapezoid, an alpha, or a triangle. These curves are generally representative of the optical fiber's theoretical profile (i.e., the set profile). Constraints in the manufacture of the optical fiber, however, may yield a slightly different refractive-index profile.

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$). As will be understood by those having ordinary skill in the art, the propagation of an optical signal in a single-mode optical fiber includes a fundamental mode, typically denoted LP01, which is guided in the core, and secondary modes, which are guided over a certain distance in the core and the optical cladding.

Optical fibers typically include a central core that has a radius $r_1$ and a refractive index $n_1 > n_g$. Optical fibers may also include one or more cladding layers positioned between the central core and the optical cladding. These cladding layers have respective radii $r_i$ and refractive indices $n_i < n_1$ that may be less than or greater than the refractive index $n_g$ of the optical cladding. A cladding layer between the central core and the optical cladding with a refractive index similar to the optical cladding's refractive index $n_g$ is sometimes referred to as an internal cladding. Additionally, a cladding layer with a refractive index lower than the optical cladding's refractive index $n_g$ is sometimes referred to as a buried cladding, trench, and/or buried trench.

Single-mode optical fibers (SMFs) with step-index profile are often used within optical-fiber transmission systems as line fibers. Such optical fibers typically possess values for chromatic dispersion, chromatic-dispersion slope, cut-off wavelength, and effective area that comply with specific telecommunications standards.

The cable cut-off wavelength is conventionally measured as being the wavelength at which the optical signal is no longer single mode after propagating over 22 meters in the optical fiber, as defined by subcommittee 86A of the International Electrotechnical Commission (IEC) in standard IEC 60793-1-44. The IEC 60793-1-44 is hereby incorporated by reference in its entirety.

In most circumstances, the secondary mode that best withstands bending losses is the LP11 mode. The cable cut-off wavelength is thus the wavelength from which the LP11 mode is sufficiently attenuated after propagating for 22 meters in an optical fiber. The method proposed by the IEC 60793-1-44 standard considers that the optical signal is single mode as long as the attenuation of the LP11 mode is greater than or equal to 19.3 decibels (dB). According to the recommendations of IEC subcommittee 86A in standard IEC 60793-1-44, the cable cut-off wavelength is determined by arranging the optical fiber such that it forms two loops having a radius of 40 millimeters (mm) and arranging the remainder of the optical fiber (i.e., 21.5 meters of optical fiber) on a mandrel having a radius of 140 millimeters.

The IEC 60793-1-44 standard also defines the effective fiber cut-off wavelength. The effective fiber cut-off wavelength is conventionally measured as the wavelength at which the optical signal is no longer single mode (i.e., when the attenuation of the LP11 mode is greater than or equal to 19.3 dB) after propagating over two meters of fiber, while arranging one loop of the optical fiber on a mandrel having a radius of 140 millimeters.

Typically, for terrestrial transmission systems, standard single-mode fibers (SSMF) are used. Such standard single-mode fibers have a positive dispersion (D) and a positive dispersion slope (P), an effective area (S) of about 80 $\mu m^2$, and an attenuation of about 0.19 dB/km (measured at a wavelength of 1550 nm).

Submarine transmission systems with repeaters typically use hybrid transmission lines with both (i) optical fibers having a positive dispersion, a large effective area (about 100-110 $\mu m^2$), and a low attenuation (0.17-0.19 dB/km measured at a wavelength of 1550 nm) and (ii) optical fibers with negative dispersion.

Undersea transmission systems without repeaters typically use transmission lines including combinations of optical fibers having a positive dispersion (e.g., pure-silica-core fibers having an effective area of between 80 $\mu m^2$ and 110 $\mu m^2$). Record-breaking results in terms of capacity relative to distance have recently been obtained in the laboratory with optical fibers having an effective area of about 120 µm² using coherent detection and sophisticated modulation formats.

As known by those having ordinary skill in the art, an increase in the effective area of a transmission optical fiber contributes to the reduction of non-linear effects in the optical fiber. A transmission optical fiber having an enlarged effective area facilitates transmission over a longer distance and/or an increase in the functional bands of the transmission system. Typically, optical-fiber modifications that are intended to achieve increased effective areas also increase bending losses and the optical fiber's cut-off wavelength.

At present, while maintaining low bending losses and a cable cut-off wavelength ($\lambda_{cc}$) less than 1450 nanometers (nm), the maximum achievable effective area ($A_{eff}$) is about 130 µm². Furthermore, an effective area ($A_{eff}$) of about 130 µm² currently represents the maximum effective area ($A_{eff}$) suitable for ensuring a chromatic dispersion and chromatic dispersion slope that can be processed either by compensation modules or by coherent detection and sophisticated modulation formats.

To increase the effective area of single-mode optical fibers, step-index fiber profiles are usually employed in either constant cladding or buried cladding configurations.

U.S. Pat. No. 6,658,190, which is hereby incorporated by reference in its entirety, describes optical fibers that have an effective area ($A_{eff}$) greater than 100 µm². The examples described in U.S. Pat. No. 6,658,190, however, exhibit undesirably increased bending losses and/or fabrication costs. Sample 5 of U.S. Pat. No. 6,658,190 discloses a single-mode-fiber profile with constant cladding and an effective area of 155 µm², but its macrobending and microbending losses are unsatisfactory. Samples 6, 7, and 8, which use step-index fiber and buried-cladding profiles, have effective areas greater than 150 µm² but the outer radius of the buried cladding is very large (e.g., greater than 29 microns (µm)), which increases fabrication cost.

U.S. Pat. No. 7,076,139, which is hereby incorporated by reference in its entirety, describes step-index and buried-cladding optical fibers for which $\Delta n_1 < 4.4 \times 10^{-3}$ and $A_{eff} \geq 120$ µm². None of the examples described in U.S. Pat. No. 7,076,139, however, use a fiber profile capable of simultaneously achieving an increased effective area, low bending losses, and a low buried cladding outer radius. Table 2 in U.S. Pat. No. 7,076,139 shows an example with $A_{eff}$ of 156 µm², but the outer radius of the buried cladding is approximately 31 microns, which significantly increases manufacturing costs.

U.S. Pat. No. 6,483,975, which is hereby incorporated by reference in its entirety, discloses optical fiber profiles including a central core, an intermediate cladding, and a buried cladding having an effective area ($A_{eff}$) greater than 100 µm². The radius of the central core, however, is too small (e.g., less than 6.4 microns) and the buried cladding is too large (e.g., greater than 15 microns) and insufficiently deep (e.g., a depth above $-2.9 \times 10^{-3}$) to make it possible to obtain both an effective area greater than 150 µm² and satisfactory bending losses. Additionally, the outer radius of the buried cladding is very large, which significantly increases manufacturing costs.

European Patent No. 1,477,831 and its counterpart U.S. Pat. No. 6,904,218, each of which is hereby incorporated by reference in its entirety, describe optical fiber profiles including a central core, an intermediate cladding, and a buried cladding. The disclosed optical fibers have an effective area ($A_{eff}$) greater than 95 µm² (e.g., an $A_{eff}$ of about 171 µm²) and a cable cut-off wavelength ($\lambda_{cc}$) less than or equal to 1310 nanometers. With such cable-cut-off-wavelength values, however, it is not possible to achieve both an effective area ($A_{eff}$) greater than or equal to 150 µm² and good bending loss performance. Moreover, the outer radius of the buried cladding is very large (e.g., greater than 33 microns), which significantly increases manufacturing costs.

U.S. Pat. No. 7,254,305, which is hereby incorporated by reference in its entirety, describes optical fiber profiles including a central core, an intermediate cladding, and a buried cladding. The disclosed optical fibers have a chromatic dispersion slope less than 0.07 ps/(nm²·km) and attenuation less than 0.20 dB/km. For a cable cut-off wavelength ($\lambda_{cc}$) of 1854 nanometers, the maximum effective area ($A_{eff}$) disclosed is 106 µm². For the disclosed optical-fiber profiles, however, the values of $\Delta n_1$ (i.e., the refractive index difference between the central core and the outer cladding) and $\Delta n_3$ (i.e., the refractive index difference between the trench and the outer cladding) are too high to obtain both an effective area greater than 150 µm² and satisfactory bending losses.

European Patent No. 1,978,383 and its counterpart U.S. Patent Publication No. 2011/0044595, each of which is hereby incorporated by reference in its entirety, describe optical fiber profiles including a central core, an intermediate cladding, and a buried cladding. The disclosed optical fibers have an effective area ($A_{eff}$) greater than or equal to 120 µm² and an effective fiber cut-off wavelength less than 1600 nanometers. All the disclosed examples have central core refractive index difference $\Delta n_1$ greater than $3.9 \times 10^{-3}$. With the disclosed constraints on cut-off wavelength and central core refractive index difference, however, it is not possible to achieve an effective area greater than or equal to 150 µm². The highest disclosed value of effective area is only 135 µm².

International Patent Application Publication No. WO 2008/137150 and its counterpart U.S. Pat. No. 7,555,187, each of which is hereby incorporated by reference in its entirety, describe a fiber profile including a central core, an intermediate cladding, and a buried cladding. The disclosed optical fibers have an effective area ($A_{eff}$) greater than 110 µm², a cable cut-off wavelength ($\lambda_{cc}$) less than 1500 nanometers, and macrobending losses less than 0.7 decibels per turn (dB/turn) for a bend radius of 10 millimeters at a wavelength of 1550 nanometers. With the disclosed constraints on cable cut-off wavelength ($\lambda_{cc}$) and/or bending losses, however, it is not possible to achieve an effective area greater than or equal to 150 µm².

International Patent Application Publication No. WO 2008/137150 discloses two fiber examples with effective area greater than 150 µm². Fiber 7 has an effective area of 155 µm², but the outer radius of the buried cladding is too large (e.g., approximately 27.5 microns), which increases fabrication costs. Fiber 8 has an effective area of 167 µm² and a buried-cladding outer radius of 18.5 microns, but the macrobending losses are relatively high (e.g., about 10 decibels per meter (dB/m) at a wavelength of 1550 nanometers and greater than 0.1 dB/100 turns for a bend radius of 30 millimeters at a wavelength of 1625 nanometers). Moreover, the volume of the trench (i.e., the buried cladding) does not account for the dimensions of the central core.

Therefore, a need exists for an improved bend-resistant, single-mode optical fiber having an effective area of at least 150 µm² that can be achieved without significantly increasing manufacturing costs.

SUMMARY

Accordingly, in one aspect, the present invention embraces an optical fiber that includes a central core, an intermediate cladding, a buried trench, and an optical cladding (e.g., an outer optical cladding). Typically, the central core has an outer radius $r_1$ and a maximum refractive index difference $\Delta n_1$ with respect to the optical cladding of between about $2.6 \times 10^{-3}$ to $3.5 \times 10^{-3}$. The optical fiber typically has an effective area of about 150 μm² or greater at a wavelength of 1550 nanometers.

The intermediate cladding is typically positioned between the central core and the optical cladding (e.g., immediately surrounding the central core). The intermediate cladding has an outer radius $r_2$ and a refractive index difference $\Delta n_2$ with respect to the optical cladding.

The buried trench is typically positioned between the intermediate cladding and the optical cladding (e.g., immediately surrounding the intermediate cladding). The buried trench has an outer radius $r_3$ and a refractive index difference $\Delta n_3$ with respect to the optical cladding.

In an exemplary embodiment, the buried trench's outer radius $r_3$ is about 24 microns or less (e.g., between about 14 microns and 20 microns).

In another exemplary embodiment, the buried trench's refractive index difference $\Delta n_3$ is between about $-15.0 \times 10^{-3}$ and $-4.5 \times 10^{-3}$.

In yet another exemplary embodiment, the buried trench's volume $V_{13}$ is between about 170%·μm² and 830%·μm².

In yet another exemplary embodiment, the buried trench's volume $V_{13}$ and the central core's volume $V_{11}$ (in units of %·μm²) satisfy the following inequality:

$$V_{13} > 2.21 \times 10^4 \cdot \exp(-0.117 \cdot V_{11}) + 170.$$

In yet another exemplary embodiment, at a wavelength of 1550 nanometers, the optical fiber exhibits macrobending losses of less than about 5 dB/m for a bend radius of 10 millimeters.

In yet another exemplary embodiment, at a wavelength of 1625 nanometers, the optical fiber exhibits macrobending losses of less than about 10 dB/m for a bend radius of 10 millimeters.

In yet another exemplary embodiment, at a wavelength of 1625 nanometers, the optical fiber exhibits macrobending losses of less than about 0.05 dB/100 turns for a bend radius of 30 millimeters.

In yet another exemplary embodiment, the central core's outer radius $r_1$ is between about 6.5 microns and 10 microns.

In yet another exemplary embodiment, the difference between the intermediate cladding's outer radius $r_2$ and the central core's outer radius $r_1$ (i.e., $r_2 - r_1$) is between about 2.0 microns and 10 microns (e.g., between about 3.5 microns and 7 microns).

In yet another exemplary embodiment, the intermediate cladding's outer radius $r_2$ is between about 8.5 microns and 20.0 microns.

In yet another exemplary embodiment, the difference between the buried trench's outer radius $r_3$ and the intermediate cladding's outer radius $r_2$ (i.e., $r_3 - r_2$) is between about 3 microns and 12 microns.

In yet another exemplary embodiment, the intermediate cladding's refractive index difference $\Delta n_2$ is between about $-1 \times 10^{-3}$ and $1 \times 10^{-3}$.

In yet another exemplary embodiment, the optical fiber's cable cut-off wavelength is about 2000 nanometers or less, typically about 1800 nanometers or less (e.g., about 1600 nanometers or less).

In yet another exemplary embodiment, at a wavelength of 1550 nanometers, the optical fiber's mode field diameter (MFD) is about 13 microns or more.

In yet another exemplary embodiment, at a wavelength of 1550 nanometers, the optical fiber exhibits chromatic dispersion of between about 14 ps/(nm·km) and 24 ps/(nm·km) (e.g., about 14 ps/(nm·km) to about 22 ps/(nm·km)).

In yet another exemplary embodiment, at a wavelength of 1550 nanometers, the optical fiber exhibits a chromatic dispersion slope of about 0.08 ps/(nm²·km) or less (e.g., about 0.070 ps/(nm²·km) or less).

In another aspect, the present invention embraces an optical transmission system that includes at least a portion of an optical fiber in accordance with the foregoing.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a single-mode optical fiber having an enlarged effective area. Typically, the optical fiber includes a central core, an intermediate cladding, a buried trench (e.g., a buried cladding or depressed trench), and an optical cladding (e.g., an outer optical cladding). The optical fiber's central core typically has a step-index, trapezoidal, or graded-index profile. That said, the central core may possess other refractive-index profiles.

In an exemplary embodiment, the optical fiber has an effective area enlarged to values of 150 μm² or greater. This can be achieved, for example, by relaxing the constraints regarding cable cut-off wavelength ($\lambda_{cc}$), such as allowing the optical fiber's cable cut-off wavelength ($\lambda_{cc}$) to exceed 1450 nanometers. That said, exemplary embodiments of the optical fiber of the present invention typically have a cable cut-off wavelength ($\lambda_{cc}$) of about 2000 nanometers or less.

At a wavelength of 1550 nanometers, optical fibers according to the present invention typically exhibit (i) chromatic dispersion of between 14 ps/(nm·km) and 24 ps/(nm·km) (e.g., between 14 ps/(nm·km) and 22 ps/(nm·km)) and (ii) chromatic dispersion slope of less than 0.08 ps/(nm²·km) (e.g., less than 0.070 ps/(nm²·km)).

An exemplary single-mode optical fiber has an effective area greater than or equal to about 150 μm² and (i) exhibits chromatic dispersion of less than 22 ps/(nm·km), (ii) exhibits chromatic dispersion slope of less than 0.07 ps/(nm²·km), and (iii) guarantees single-mode transmission over the extended C band (i.e., from 1530 nanometers to 1569 nanometers).

The central core, the intermediate cladding, and the buried trench are typically produced inside a silica tube by chemical vapor deposition (CVD). The exterior optical cladding consists of the silica tube itself and any overcladding of the tube, which is generally natural or doped silica. The exterior optical cladding may also be produced by any other deposition technique, such as vapor axial deposition (VAD) or outside vapor deposition (OVD).

By way of example, the buried cladding may be obtained by plasma chemical vapor deposition (PCVD), making it possible to incorporate a large quantity of fluorine (or any other dopant that reduces the refractive index compared to that of silica) to form a deeply buried cladding. Producing the buried cladding by incorporating microholes or microbubbles rather than by doping is also within the scope of the invention. For industrial fabrication, however, doping is generally easier to control than incorporating microbubbles.

In exemplary embodiments of the optical fiber, the buried trench's position and volume $V_{13}$ are modified as a function of the central core's dimensions. In this regard, the buried trench's position and volume facilitate reduced bending losses, reduced fabrication costs, and in some embodiments a cable cut-off wavelength ($\lambda_{cc}$) of 2000 nanometers or less.

Typically, for a given effective area ($A_{\mathit{eff}}$), the buried trench's volume $V_{13}$ facilitates the achievement of low macrobending losses while simultaneously reducing the optical fiber's cable cutoff wavelength ($\lambda_{cc}$). In some exemplary embodiments, at a wavelength of 1550 nanometers, the optical fiber exhibits macrobending losses of less than 5 dB/m for a bend radius of 10 millimeters. Additionally, at a wavelength of 1625 nanometers, exemplary optical fibers exhibit macrobending losses of (i) less than 10 dB/m for a bend radius of 10 millimeters and (ii) less than 0.05 dB/100 turns for a bend radius of 30 millimeters.

The buried trench's position within the optical fiber can help to achieve reduced fabrication costs and reduced microbending losses while simultaneously maintaining desirable chromatic dispersion and chromatic dispersion slope values. For example, those of ordinary skill in the art will recognize that reducing the buried trench's outer radius typically reduces manufacturing costs. In exemplary embodiments, at a wavelength of 1550 nanometers, the optical fiber exhibits (i) chromatic dispersion of between 14 ps/(nm·km) and 24 ps/(nm·km) (e.g., between about 14 ps/(nm·km) and 22 ps/(nm·km)) and (ii) chromatic dispersion slope of 0.08 ps/(nm²·km) or less (e.g., 0.070 ps/(nm²·km) or less).

Figure 1:
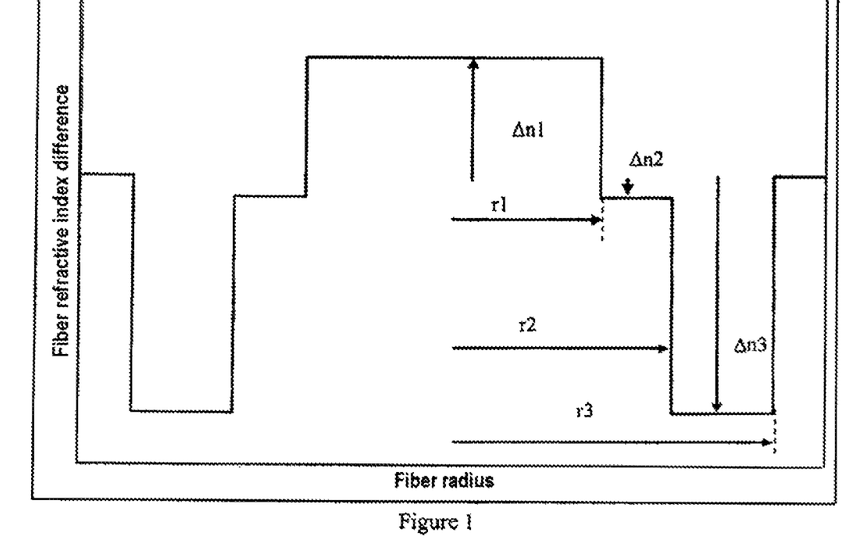
FIG. 1 graphically depicts the set refractive-index profile of an exemplary optical fiber according to the present invention.
Figure 2:
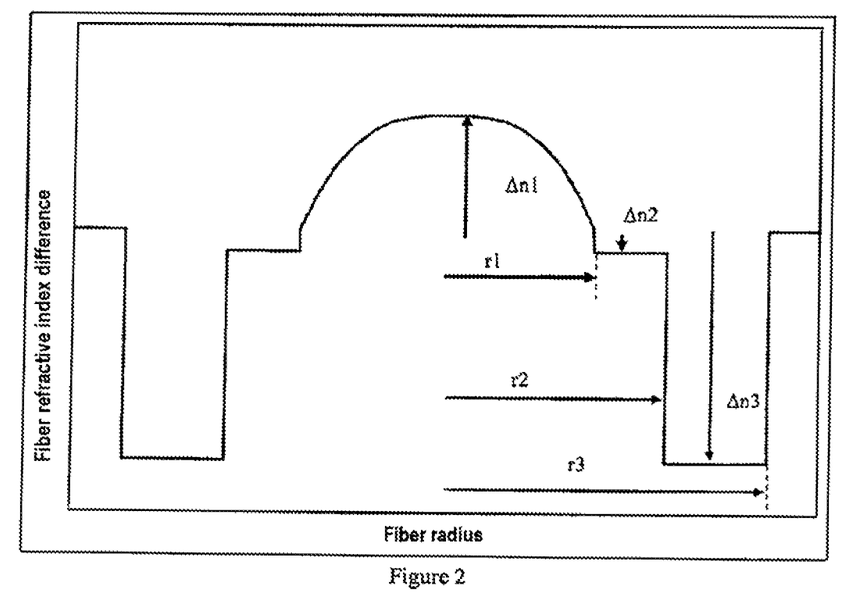
FIG. 2 graphically depicts the set refractive-index profile of another exemplary optical fiber according to the present invention.

FIG. 1 graphically depicts the set refractive-index profile of an exemplary optical fiber according to the present invention, and FIG. 2 graphically depicts the set refractive-index profile of another exemplary optical fiber according to the present invention. The exemplary optical fiber of FIG. 1 has a step-index profile (i.e., a stepped central core). The exemplary optical fiber of FIG. 2 has a graded-index profile (i.e., an alpha-shaped or alpha-index central core, also known as a parabolic core). The optical fiber's central core may also have a trapezoidal shape or other refractive-index profiles. The refractive-index profiles of FIGS. 1 and 2 are generally representative of the optical fiber's theoretical or set profile. As noted, constraints in the manufacture of the optical fiber may result in a slightly different actual profile.

Those of ordinary skill in the art will recognize that optical fibers are obtained by drawing an optical preform. The preform may include, for example, a high quality glass tube (e.g., a pure silica tube) that forms part of the final exterior optical cladding that surrounds the optical fiber's central core and internal claddings. The glass tube may be overcladded to increase its diameter before drawing on a fiber-drawing tower. To fabricate the preform, the glass tube is typically mounted horizontally in a glass-making lathe and retained at its two ends by glass rods. The tube is rotated and heated locally to deposit components (e.g., silica and dopants) that determine the composition of the optical preform. This composition determines the optical characteristics of the finished optical fiber.

As noted, the present invention embraces an optical fiber including a central core, an intermediate cladding, a buried trench, and an optical cladding (e.g., an outer optical cladding). FIG. 1 depicts a central core having a step refractive-index profile. Thus, the central core's refractive index difference is constant and equal to the central core's maximum refractive index difference $\Delta n_1$. That said, the central core may also have a trapezoidal, triangular, or alpha profile (i.e., a refractive-index profile that varies as a function of radial position). For example, FIG. 2 depicts a central core having a graded-index profile.

Furthermore, both FIG. 1 and FIG. 2 depict inner cladding layers (i.e., the intermediate cladding and the buried trench), each having a constant refractive index difference with respect to the optical cladding. Exemplary optical fibers according to the invention, however, may have one or more refractive index differences that vary as a function of radial position (e.g., a trapezoidal, triangular, or alpha profile). For an inner cladding layer having non-constant refractive index, the respective refractive index difference (e.g., the buried trench's refractive index difference $\Delta n_3$) refers to the largest refractive index difference between an inner cladding layer and the optical cladding in terms of absolute value. The intermediate cladding's refractive index difference $\Delta n_e$ may be positive or negative. The buried trench's refractive index difference $\Delta n_3$ is typically negative. Throughout the present description, the expression of a refractive index difference may include refractive index difference of zero (i.e., the compared refractive indices are equal).

In FIG. 2, the central core's maximum refractive index difference $\Delta n_1$ is located at the center of the optical fiber (i.e., r=0). The central core's minimum refractive index difference is located at the optical fiber's outer radius $r_1$ and is typically equivalent to the intermediate cladding's refractive index difference $\Delta n_2$.

As noted, the refractive index differences of the central core, the intermediate cladding, and the buried trench are measured with respect to the optical cladding refractive index. Those of ordinary skill in the art will recognize that the optical cladding typically has a constant refractive index. That said, if the optical cladding has a non-constant refractive index, refractive index differences are typically measured with respect to the innermost portion of the optical cladding (i.e., that portion of the optical cladding that is closest to the central core and that may affect the propagation of optical signals within the optical fiber). The optical cladding is typically doped or undoped silica.

Generally speaking, a refractive index difference can also be expressed using the following equation:

$$\Delta n(r) = n(r) - n_{cladding}$$

where n(r) is the comparative refractive index value as a function of radial position (e.g., the refractive index $n_3$ of a buried trench), and $n_{cladding}$ is the refractive index value of the optical cladding. Those of ordinary skill in the art will recognize that this equation can be used if the refractive index varies over a given section of the optical fiber (i.e., the refractive index value varies as a function of radial position) or if the refractive index is constant over a given section.

Thus, a constant refractive index difference with respect to an optical cladding can be expressed using the following equation:

$$\Delta n = n - n_{cladding}$$

where n is the comparative refractive index value (e.g., the refractive index $n_3$ of a buried trench), and $n_{cladding}$ is the refractive index value of the outer cladding.

Each section of the optical fiber's refractive-index profile (i.e., the central core and each cladding layer) may be described by integrals that link the index variation and the radius of each section of the optical fiber. It is thus possible to define at least two volume integrals for an optical fiber representing (i) the central core's volume $V_{11}$ and (ii) the buried trench's volume $V_{13}$. The term "volume" is not to be understood in a geometrical sense but rather as a value taking account of three dimensions. These two volume integrals may be expressed as follows:

$$V_{11} = 2\pi \left| \int_0^{r_1} \Delta n(r) r\, dr \right|; \text{ and}$$

$$V_{13} = 2\pi \left| \int_{r_2}^{r_3} \left( \Delta n(r) - \left( \frac{1}{r_2 - r_1} \right) \int_{r_1}^{r_2} \Delta n(r)\, dr \right) r\, dr \right|.$$

Tables 1A and 1B (below) characterize the set refractive-index profiles of both inventive and comparative and optical-fiber examples (e.g., prophetic examples), namely eleven exemplary optical fibers and six comparative optical fibers. Exemplary optical fibers ST1, ST3, ST4, ST6, ST7, ST10, ST11, ST13, ST14, and ST15 include step-index core profiles similar to that shown in FIG. 1. Exemplary optical fiber AL2 includes a graded-index core profile similar to that shown in FIG. 2.

The comparative optical fibers ST2*, ST5*, ST8*, ST9*, and ST12* are marked with an asterisk and include step-index core profiles. Comparative optical fiber AL1* is similarly marked with an asterisk but includes a graded-index core profile. The characteristics of these comparative optical fibers that depart from exemplary embodiments of present invention are indicated in bold. For comparative optical fibers that do not include a buried trench, the relevant portions of the tables are empty. The comparative optical fibers are designated as "comparative" rather than "exemplary" because they do not satisfy Equation 1 (below) or otherwise have deficiencies. That said, embodiments of the present invention may include optical fibers having set refractive-index profiles similar to these comparative optical fibers.

In Table 1A, the first column identifies each exemplary and comparative optical fiber. The second column provides the alpha parameter if the central core has an alpha-shaped profile (i.e., graded-index profile). The next three columns provide the outer radii of the central core $r_1$, the intermediate cladding $r_2$, and, where applicable, the buried trench $r_3$. The following three columns provide the values of the respective refractive-index differences for the central core $\Delta n_1$, the intermediate cladding $\Delta n_2$, and the buried trench $\Delta n_3$. The refractive index values are measured at a wavelength of 633 nanometers. The next column provides the difference between the intermediate cladding's outer radius $r_2$ and the central core's outer radius $r_1$ (i.e., $r_2 - r_1$). The final column provides the difference between the buried trench's outer radius $r_3$ and the intermediate cladding's outer radius $r_2$ (i.e., $r_3 - r_2$). Comparative optical fiber profiles ST2* and ST5* do not have buried trenches and so the columns giving the values of $r_3$, $\Delta n_3$, and $r_3 - r_2$ are empty.

In Table 1B, the first column identifies each exemplary and comparative optical fiber referenced in Table 1A. The final three columns provide the central core's volume, the buried trench's volume, and minimum buried-trench volume that achieves suitable bending losses (e.g., as discussed (below) with respect to Equation 1).

Although comparative optical fiber profiles ST2* and ST5* do not have buried trenches, indicative theoretical values of the minimum buried-trench volume to achieve suitable bending losses are provided. These theoretical values are provided solely for purposes of comparison with the exemplary optical fibers.

TABLE 1A

| Example | alpha | $r_1$ (μm) | $r_2$ (μm) | $r_3$ (μm) | $\Delta n_1$ at 633 nm (×10³) | $\Delta n_2$ at 633 nm (×10³) | $\Delta n_3$ at 633 nm (×10³) | $r_2 - r_1$ (μm) | $r_3 - r_2$ (μm) |
|---|---|---|---|---|---|---|---|---|---|
| ST1 | — | 7.15 | 10.81 | 16.40 | 2.9 | −0.2 | −7.7 | 3.7 | 5.6 |
| ST2* | — | 7.13 | 16.74 | — | 3.5 | −0.2 | — | 9.6 | — |
| ST3 | — | 7.28 | 11.72 | 17.58 | 3.1 | −0.2 | −6.7 | 4.4 | 5.9 |
| ST4 | — | 8.76 | 12.74 | 16.81 | 3.3 | −0.2 | −6.7 | 4.0 | 4.1 |
| ST5* | — | 8.41 | 16.94 | — | 3.0 | −0.2 | — | 8.5 | — |
| ST6 | — | 7.67 | 11.78 | 17.62 | 3.0 | −0.2 | −6.7 | 4.1 | 5.8 |
| ST7 | — | 7.90 | 11.74 | 17.21 | 2.8 | −0.2 | −5.7 | 3.8 | 5.5 |
| ST8* | — | 7.90 | 11.94 | 14.41 | 2.8 | −0.2 | −6.7 | 4.0 | 2.5 |
| ST9* | — | 7.90 | 11.74 | 25.74 | 2.8 | −0.2 | −5.7 | 3.8 | 14.0 |
| ST10 | — | 9.84 | 13.41 | 18.47 | 2.9 | −0.2 | −6.7 | 3.6 | 5.1 |
| ST11 | — | 7.28 | 15.74 | 19.60 | 3.1 | −0.2 | −6.7 | 8.5 | 3.9 |
| ST12* | — | 7.90 | 9.94 | 14.41 | 2.8 | −0.2 | −5.7 | 2.0 | 4.5 |
| ST13 | — | 7.06 | 13.20 | 16.30 | 3.5 | −0.2 | −8.0 | 6.1 | 3.1 |
| ST14 | — | 6.55 | 12.24 | 17.50 | 2.7 | −0.2 | −14.9 | 5.7 | 5.3 |
| ST15 | — | 7.90 | 16.90 | 22.37 | 2.8 | −0.2 | −4.6 | 9.0 | 5.5 |
| AL1* | 10 | 7.00 | 13.60 | 18.70 | 2.8 | 0.0 | −6.8 | 6.6 | 5.1 |
| AL2 | 10 | 7.00 | 12.00 | 17.10 | 2.8 | 0.0 | −13.0 | 5.0 | 5.1 |

TABLE 1B

| Example | Core volume (% · μm²) | Trench volume (% · μm²) | Trench minimum volume (% · μm²) |
|---|---|---|---|
| ST1 | 47 | 358 | 265 |
| ST2* | 56 | — | 203 |
| ST3 | 51 | 352 | 226 |
| ST4 | 78 | 244 | 172 |
| ST5* | 68 | — | 178 |
| ST6 | 56 | 352 | 201 |
| ST7 | 55 | 275 | 204 |
| ST8* | 55 | 134 | 204 |
| ST9* | 55 | 912 | 204 |
| ST10 | 89 | 329 | 171 |
| ST11 | 51 | 279 | 226 |
| ST12* | 55 | 189 | 204 |
| ST13 | 54 | 224 | 210 |
| ST14 | 36 | 722 | 508 |
| ST15 | 55 | 297 | 204 |
| AL1* | 36 | 352 | 517 |
| AL2 | 36 | 606 | 517 |

Tables 2A and 2B (below) provide the optical properties of the exemplary optical fibers and comparative optical fibers of Tables 1A and 1B. As in Tables 1A and 1B, the optical properties of these comparative optical fibers that depart from exemplary embodiments of present invention are shown in bold.

In Table 2A, the first column identifies each exemplary and comparative optical fiber referenced in Tables 1A and 1B. The next two columns provide the chromatic dispersion and the chromatic dispersion slope at a wavelength of 1550 nanometers. The next column provides the mode field diameter (MFD) at a wavelength of 1550 nanometers. The next column provides the effective area ($A_{eff}$) at a wavelength of 1550 nanometers. The final column provides the cable cut-off wavelength ($\lambda_{cc}$).

In Table 2B, the first column identifies each exemplary and comparative optical fiber referenced in Tables 1A, 1B, and 2A. The next two columns provide macrobending losses for a bend radius of 10 millimeters at wavelengths of 1550 nanometers and 1625 nanometers, respectively. The final column provides macrobending losses for a bend radius of 30 millimeters at a wavelength of 1625 nanometers (i.e., decibels per 100 turns).

TABLE 2A

| Example | Dispersion at 1550 nm (ps/(nm·km)) | Slope at 1550 nm (ps/(nm²·km)) | MFD at 1550 nm (μm) | $A_{eff}$ at 1550 nm (μm²) | $\lambda_{cc}$ (nm) |
|---|---|---|---|---|---|
| ST1 | 21.8 | 0.065 | 13.5 | 155 | 1462 |
| ST2* | 20.4 | 0.063 | 13.7 | 155 | 1440 |
| ST3 | 21.5 | 0.065 | 13.8 | 160 | 1498 |
| ST4 | 21.7 | 0.065 | 15.1 | 200 | 1760 |
| ST5* | 20.8 | 0.063 | 15.4 | 200 | 1501 |
| ST6 | 21.6 | 0.065 | 14.1 | 170 | 1579 |
| ST7 | 21.6 | 0.065 | 14.5 | 180 | 1525 |
| ST8* | 21.5 | 0.064 | 14.5 | 180 | 1461 |
| ST9* | 21.7 | 0.065 | 14.5 | 180 | >2000 |
| ST10 | 21.8 | 0.065 | 16.4 | 240 | 1843 |
| ST11 | 20.5 | 0.064 | 14.3 | 167 | 1545 |
| ST12* | 22.1 | 0.064 | 13.8 | 167 | 1435 |
| ST13 | 20.9 | 0.064 | 13.5 | 152 | 1547 |
| ST14 | 21.3 | 0.066 | 13.6 | 151 | 1591 |
| ST15 | 20.7 | 0.064 | 15.2 | 189 | 1596 |
| AL1* | 20.2 | 0.065 | 14.0 | 156 | 1380 |
| AL2 | 20.5 | 0.065 | 13.9 | 154 | 1552 |

TABLE 2B

| Example | Macrobending losses at 1550 nm R = 10 mm (dB/m) | Macrobending losses at 1625 nm R = 10 mm (dB/m) | Macrobending losses at 1625 nm R = 30 mm (dB/100 turns) |
|---|---|---|---|
| ST1 | 1.0 | 1.9 | ≤0.03 |
| ST2* | 36 | 64 | ≤0.01 |
| ST3 | 0.7 | 1.2 | ≤0.01 |
| ST4 | 1.3 | 2.4 | <10⁻⁴ |
| ST5* | 108 | 163 | ≤0.02 |
| ST6 | 0.7 | 1.2 | ≤0.01 |
| ST7 | 2.6 | 4.4 | ≤0.02 |
| ST8* | 25 | 38 | ≥0.1 |
| ST9* | <10⁻² | <10⁻² | <10⁻³ |
| ST10 | 1.1 | 2.0 | <10⁻³ |
| ST11 | 1.8 | 3.2 | ≤0.01 |
| ST12* | 11 | 18 | ≥0.1 |
| ST13 | 1.6 | 3.1 | <10⁻³ |
| ST14 | 0.1 | 0.2 | ≤0.04 |
| ST15 | 1.7 | 3.1 | ≤0.02 |
| AL1* | 2.4 | 4.1 | ≥0.3 |
| AL2 | 0.2 | 0.3 | ≤0.04 |

As noted, the central core's volume $V_{11}$ is defined as follows:

$$V_{11} = 2\pi \left| \int_0^{r_1} \Delta n(r) r \, dr \right|.$$

The buried trench's volume $V_{13}$ is defined as follows:

$$V_{13} = 2\pi \left| \int_{r_2}^{r_3} \left( \Delta n(r) - \left( \frac{1}{r_2 - r_1} \right) \int_{r_1}^{r_2} \Delta n(r) dr \right) r \, dr \right|.$$

Accordingly, in the particular embodiments of FIG. 1 and FIG. 2 in which the buried trench has a step-index profile, the buried trench's volume $V_{13}$ may be simplified as follows:

$$\pi(r_3^2 - r_2^2) \cdot (\Delta n_2 - \Delta n_3).$$

Each of the exemplary optical fibers of Tables 1A, 1B, 2A, and 2B possesses the following properties: (i) an effective area of 150 μm² or greater; (ii) chromatic dispersion of less than 22 ps/(nm·km); (iii) chromatic dispersion slope of less than 0.07 ps/(nm²·km); (iv) at a wavelength of 1550 nanometers, macrobending losses of less than about 5 dB/m for a bend radius of 10 millimeters; (v) at a wavelength of 1625 nanometers, macrobending losses of less than about 10 dB/m for a bend radius of 10 millimeters; and (vi) at a wavelength of 1625 nanometers, macrobending losses of less than about 0.05 dB/100 turns for a bend radius of 30 millimeters.

Simulations have indicated that buried-trench volumes of less than 830%·μm² may prevent cable cut-off wavelengths ($\lambda_{cc}$) from exceeding 2000 nanometers. That said, buried-trench volumes should be large enough to provide acceptable bending losses.

Simulations have also indicated that, for a bend radius of 10 millimeters, macrobending losses less than 5 dB/m and 10 dB/m can be achieved at wavelengths of 1550 nanometers and 1625 nanometers, respectively, if the volume $V_{13}$ (or $V_{trench}$) of the trench as a function of the volume $V_{11}$ (or $V_{core}$) of the central core satisfies Equation 1 (below).

Similarly, the present inventors have found that, for a bend radius of 30 millimeters macrobending losses less than 0.05 dB/100 turns can be achieved at a wavelength of 1625 nanometers, if the volume $V_{13}$ (or $V_{trench}$) of the trench as a function of the volume $V_{11}$ (or $V_{core}$) of the central core satisfies Equation 1 (below).

$$V_{trench} > 2.21 \times 10^4 \cdot \exp(-0.117 \cdot V_{core}) + 170 \qquad \text{Equation 1}$$

Figure 3:
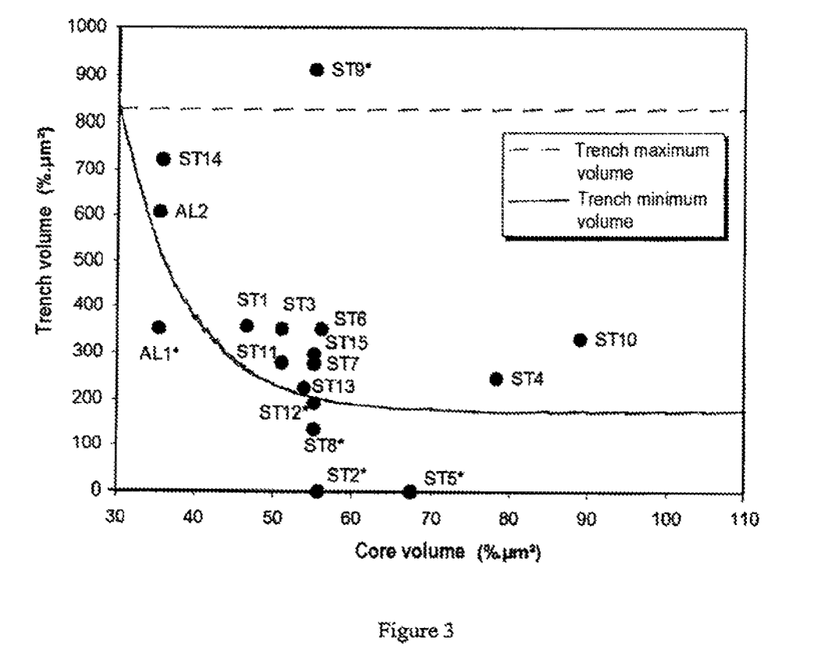
FIG. 3 graphically depicts minimum and maximum trench volumes as a function of central core volume for exemplary optical fibers according to the present invention.

In accordance with the foregoing, FIG. 3 depicts a solid-line curve labeled "Trench minimum volume." This curve represents minimum trench volume for a given central core volume as defined by Equation 1 (above). Thus, optical fibers possessing a core volume and trench volume above the solid line curve have relatively low cable cut-off wavelengths ($\lambda_{cc}$) while preserving the above-described bending loss performance. FIG. 3 also plots the location of each exemplary and comparative optical fiber from Tables 1A, 1B, 2A, and 2B.

FIG. 3 also depicts a dashed-line curve labeled "Trench maximum volume." This curve corresponds to a buried-trench volume of 830%·μm². As previously noted, buried-trench volumes of less than 830%·μm² may prevent cable cut-off wavelengths ($\lambda_{cc}$) from exceeding 2000 nanometers.

Comparative optical fibers ST2* and ST5* have refractive-index profiles that include a step-index central core, an internal cladding that is not deeply buried, and an optical cladding. Notably, they do not have a buried trench. These two comparative optical fibers ST2* and ST5* have the same effective area ($A_{eff}$) as exemplary optical fibers ST1 and ST4, respectively.

Even though exemplary optical fiber ST1 and comparative optical fiber ST2* have the same effective area ($A_{eff}$) and similar cable cut-off wavelengths ($\lambda_{cc}$), exemplary optical fiber ST1 has superior bending loss performance to that of comparative optical fiber ST2*. Indeed, at the measurement wavelengths for a bend radius of 10 millimeters, exemplary optical fiber ST1 has macrobending losses that are 30 times less than comparative optical fiber ST2*. Additionally, at a wavelength of 1625 nanometers for a bend radius of 30 millimeters, macrobending losses for the exemplary optical fiber ST1 were sufficiently low and did not degrade microbending losses.

By accepting a cable cut-off wavelength ($\lambda_{cc}$) of greater than 1700 nanometers as in exemplary optical fiber ST4 but not comparative optical fiber ST5*, macrobending losses may be reduced. Indeed, at the measurement wavelengths for a bend radius of 10 millimeters, comparative optical fiber ST5* has macrobending losses greater than 100 dB/m, whereas exemplary optical fiber ST4 has macrobending losses of less than 5 dB/m. Moreover, exemplary optical fiber ST4 and comparative optical fiber ST5* show that a buried trench can facilitate the simultaneous achievement of low macrobending losses and effective areas ($A_{eff}$) of about 200 $\mu m^2$. Furthermore, microbending loss performance is not degraded.

Comparative optical fibers ST8* and ST9* have a central core, an intermediate cladding, and a buried trench. Comparative optical fibers ST8* and ST9* also have the same effective area ($A_{eff}$) as exemplary optical fiber ST7. The characteristics of the buried trenches of comparative optical fibers ST8* and ST9*, however, are deficient.

For example, comparative optical fiber ST8* has a low buried-trench volume considering its central core's volume. Consequently, comparative optical fiber ST8* exhibits high macrobending losses for respective bend radii of 10 millimeters and 30 millimeters.

On the other hand, comparative optical fiber ST9* has a high buried-trench volume considering its central core's volume. Consequently, comparative optical fiber ST9* has a high cable cut-off wavelength ($\lambda_{cc}$), but would have increased fabrication costs because of the buried trench's large outer radius $r_3$.

Exemplary optical fiber ST11 and comparative optical fiber ST12* have the same effective area ($A_{eff}$). As depicted in FIG. 3, comparative optical fiber ST12* has buried-trench can central-core volumes that are just below the curve labeled "Trench minimum volume." Thus, comparative optical fiber ST12* nearly satisfies Equation 1. Exemplary optical fiber ST11 does satisfy Equation 1 because its buried-trench volume is greater than that of comparative optical fiber ST12* (Table 1B and FIG. 3). Consequently, comparative optical fiber ST12* exhibits high macrobending losses for bend radii of 10 millimeters and 30 millimeters (Table 2B).

Comparative optical fiber AL1* has a refractive-index profile that is very similar to example "Fiber 8" of aforementioned International Patent Application Publication No. WO 2008/137150. Comparative optical fiber AL1* has a buried-trench volume that does not satisfy Equation 1 (Table 1B and FIG. 3) and, consequently, exhibits high macrobending losses for a bend radius of 30 millimeters (Table 2B). In contrast, exemplary optical fiber AL2 has the same central core as comparative optical fiber AL1*, but exemplary optical fiber AL2 has a buried-trench volume that satisfies Equation 1 (Table 1B and FIG. 3). Consequently, exemplary optical fiber AL2 has an acceptable cable cut-off wavelength ($\lambda_{cc}$) and exhibits low macrobending losses (Tables 2A and 2B).

Exemplary optical fibers according to the present invention are well suited for deployment in long-haul terrestrial and/or undersea optical systems. In exemplary embodiments, at a wavelength of 1550 nanometers, the optical fibers have microbending losses of less than 20 dB/km as measured in accordance with the IEC fixed-diameter sandpaper drum test (i.e., IEC TR62221 Report, Method B: Fixed Diameter Drum). The IEC TR62221 microbending-sensitivity technical report and standard test procedures (e.g., IEC TR62221, Method B, Ed. 1) are hereby incorporated by reference in their entireties.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns ($\mu m$). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, the primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located at the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555, 186 for an Optical Fiber (Flammer et al.); U.S. Patent Application Publication No. US2009/0252469 A1 for a Dispersion-Shifted Optical Fiber (Sillard et al.); U.S. Patent Application Publication No. US2011/0044595 A1 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burov et al.); U.S. Patent Application Publication No. US2010/0254653 A1 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Publication No. US2011/0116160 A1 for a Rare-Earth-Doped Optical Fiber Having Small Numerical Aperture, filed Nov. 11, 2010, (Boivin et al.); U.S. Patent Publication No. US2011/0123161 A1 for a High-Bandwidth, Multimode Optical Fiber with Reduced Cladding Effect, filed Nov. 24, 2010, (Molin et al.); U.S. Patent Publication No. US2011/0123162 A1 for a High-Bandwidth, Dual-Trench-Assisted Multimode Optical Fiber, filed Nov. 24, 2010, (Molin et al.); U.S. Patent Publication No. US2011/0135262 A1 for a Multimode Optical Fiber with Low Bending Losses and Reduced Cladding Effect, filed Dec. 3, 2010, (Molin et al.); U.S. Patent Publication No. US2011/0135263 A1 for a High-Bandwidth Multimode Optical Fiber Having Reduced Bending Losses, filed Dec. 3, 2010, (Molin et al.); U.S. patent application Ser. No. 13/017,089 for a Non-Zero Dispersion Shifted Optical Fiber Having a Large Effective Area, filed Jan. 31, 2011, (Sillard et al.); U.S. patent application Ser. No. 13/017,092 for a Non-Zero Dispersion Shifted Optical Fiber Having a Short Cutoff Wavelength, filed Jan. 31, 2011, (Sillard et al.); U.S. patent application Ser. No. 13/037,943 for a Broad-Bandwidth Multimode Optical Fiber Having Reduced Bending Losses, filed Mar. 1, 2011, (Bigot-Astruc et al.); and U.S. patent application Ser. No. 13/048,028 for a Single-Mode Optical Fiber, filed Mar. 15, 2011, (de Montmorillon et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); US Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct. 19, 2010, (Tatat et al.); U.S. patent application Ser. No. 13/009,118 for a Water-Soluble Water-Blocking Element, filed Jan. 19, 2011, (Parris); U.S. patent application Ser. No. 13/096,178 for a Data-Center Cable, filed Apr. 28, 2011, (Lovie et al.); U.S. patent application Ser. No. 13/099,663 for a Bundled Fiber Optic Cables, filed May 3, 2011, (Quinn et al.); U.S. patent application Ser. No. 13/111,147 for a Curing Apparatus Employing Angled UVLEDs, filed May 19, 2011, (Molin); U.S. patent application Ser. No. 13/116,141 for a Low-Smoke and Flame-Retardant Fiber Optic Cables, filed May 26, 2011, (Lovie et al.); and U.S. patent application Ser. No. 13/152,651 for a Curing Apparatus Having UV Sources That Emit Differing Ranges of UV Radiation, filed Jun. 3, 2011, (Gharbi et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A single-mode optical fiber, comprising:
a central core surrounded by an optical cladding, said central core having (i) an outer radius $r_1$, (ii) a maximum refractive index difference $\Delta n_1$ relative to said optical cladding of between about $2.6 \times 10^{-3}$ and $3.5 \times 10^{-3}$, and (iii) a volume $V_{11}$ defined as follows:

$$V_{11} = 2\pi \left| \int_0^{r_1} \Delta n(r) r \, dr \right|;$$

an intermediate cladding positioned between said central core and said optical cladding, said intermediate cladding having an outer radius $r_2$ and a refractive index difference $\Delta n_2$ relative to said optical cladding; and
a buried trench positioned between said intermediate cladding and said optical cladding, said buried trench having (i) an outer radius $r_3$ of less than 24 microns, (ii) a refractive index difference $\Delta n_3$ relative to said optical cladding of between about $-15.0 \times 10^{-3}$ and $-4.5 \times 10^{-3}$, and (iii) a volume $V_{13}$ of between about 170%·µm² to 830%·µm² as defined as follows:

$$V_{13} = 2\pi \left| \int_{r_2}^{r_3} \left( \Delta n(r) - \left( \frac{1}{r_2 - r_1} \right) \int_{r_1}^{r_2} \Delta n(r) \, dr \right) r \, dr \right|;$$

wherein said buried trench's volume $V_{13}$ and said central core's volume $V_{11}$, expressed in units of %·µm², satisfy the following inequality:

$V_{13} > 2.21 \times 10^4 \cdot \exp(-0.117 \cdot V_{11}) + 170$; and wherein, at a wavelength of 1550 nanometers, the optical fiber has an effective area of about 150 µm² or greater.

2. The single-mode optical fiber according to claim 1, wherein, for a bend radius of 10 millimeters at a wavelength of 1550 nanometers, the optical fiber exhibits macrobending losses of 5 dB/m or less.

3. The single-mode optical fiber according to claim 1, wherein, for a bend radius of 10 millimeters at a wavelength of 1625 nanometers, the optical fiber exhibits macrobending losses of 10 dB/m or less.

4. The single-mode optical fiber according to claim 1, wherein, for a bend radius of 30 millimeters at a wavelength of 1625 nanometers, the optical fiber exhibits macrobending losses of 0.05 dB/100 turns or less.

5. The single-mode optical fiber according to claim 1, wherein said central core's outer radius $r_1$ is between about 6.5 microns and 10 microns.

6. The single-mode optical fiber according to claim 1, wherein the difference between said intermediate cladding's outer radius $r_2$ and said central core's outer radius $r_1$ is between about 2.0 microns and 10 microns.

7. The single-mode optical fiber according to claim 1, wherein the difference between said buried trench's outer radius $r_3$ and said intermediate cladding's outer radius $r_2$ is between about 3 microns and 12 microns.

8. The single-mode optical fiber according to claim 1, wherein said intermediate cladding's refractive index difference $\Delta n_2$ is between about $-1 \times 10^{-3}$ to $1 \times 10^{-3}$.

9. The single-mode optical fiber according to claim 1, wherein the optical fiber's cable cut-off wavelength is about 2000 nanometers or less.

10. The single-mode optical fiber according to claim 1, wherein the optical fiber's cable cut-off wavelength is about 1600 nanometers or less.

11. The single-mode optical fiber according to claim 1, wherein, at a wavelength of 1550 nanometers, the optical fiber's mode field diameter (MFD) is about 13 microns or greater.

12. The single-mode optical fiber according to claim 1, wherein, at a wavelength of 1550 nanometers, the optical fiber exhibits chromatic dispersion of between about 14 ps/(nm·km) and 24 ps/(nm·km).

13. The single-mode optical fiber according to claim 1, wherein, at a wavelength of 1550 nanometers, the optical fiber exhibits a chromatic dispersion slope of about 0.08 ps/(nm²·km) or less.

14. The single-mode optical fiber according to claim 1, wherein said central core possesses a step refractive-index profile.

15. The single-mode optical fiber according to claim 1, wherein said central core possesses a graded-index profile.

16. An optical system comprising at least a portion of the single-mode optical fiber according to claim 1.

17. A single-mode optical fiber, comprising:
a central core surrounded by an optical cladding, said central core possessing a step refractive-index profile and having (i) an outer radius $r_1$, (ii) a maximum refractive index difference $\Delta n_1$ relative to said optical cladding, and (iii) a volume $V_{11}$ defined as follows:

$V_{11} = 2\pi |\int_0^{r_1} \Delta n(r) r \, dr|$;

an intermediate cladding immediately surrounding said central core, said intermediate cladding having an outer radius $r_2$ and a refractive index difference $\Delta n_2$ relative to said optical cladding; and
a buried trench immediately surrounding said intermediate cladding, said buried trench having (i) an outer radius $r_3$, (ii) a refractive index difference $\Delta n_3$ relative to said optical cladding, and (iii) a volume $V_{13}$ defined as follows:

$$V_{13} = 2\pi \left| \int_{r_2}^{r_3} \left( \Delta n(r) - \left( \frac{1}{r_2 - r_1} \right) \int_{r_1}^{r_2} \Delta n(r) dr \right) r \, dr \right|;$$

wherein said buried trench's volume $V_{13}$ and said central core's volume $V_{11}$, expressed in units of %·µm², satisfy the following inequality:

$V_{13} > 2.21 \times 10^4 \cdot \exp(-0.117 \cdot V_{11}) + 170$; and wherein, at a wavelength of 1550 nanometers, the optical fiber has an effective area of about 150 µm² or greater.

18. The single-mode optical fiber according to claim 17, wherein the difference between said intermediate cladding's outer radius $r_2$ and said central core's outer radius $r_1$ is between about 3.5 microns and 7 microns.

19. The single-mode optical fiber according to claim 17, wherein the optical fiber's cable cut-off wavelength is about 1800 nanometers or less.

20. The single-mode optical fiber according to claim 17, wherein, at a wavelength of 1550 nanometers, the optical fiber exhibits chromatic dispersion of between about 14 ps/(nm·km) and 22 ps/(nm·km).

21. The single-mode optical fiber according to claim 17, wherein, at a wavelength of 1550 nanometers, the optical fiber exhibits a chromatic dispersion slope of about 0.070 ps/(nm²·km) or less.

22. An optical system comprising at least a portion of the single-mode optical fiber according to claim 17.

23. The single-mode optical fiber according to claim 17, wherein:
said central core's outer radius $r_1$ is between about 6.5 microns and 10 microns;
wherein the difference between said intermediate cladding's outer radius $r_2$ and said central core's outer radius $r_1$ is between about 2.0 microns and 10 microns; and
wherein the difference between said buried trench's outer radius $r_3$ and said intermediate cladding's outer radius $r_2$ is between about 3 microns and 12 microns.

* * * * *